(12) United States Patent
Endo

(10) Patent No.: US 11,164,687 B2
(45) Date of Patent: Nov. 2, 2021

(54) SHUNT RESISTOR MOUNT STRUCTURE

(71) Applicant: KOA CORPORATION, Ina (JP)

(72) Inventor: Tamotsu Endo, Nagano (JP)

(73) Assignee: KOA CORPORATION, Nagano (JP)

( * ) Notice: Subject to any disclaimer, the term of this patent is extended or adjusted under 35 U.S.C. 154(b) by 0 days.

(21) Appl. No.: 17/052,684

(22) PCT Filed: May 8, 2019

(86) PCT No.: PCT/JP2019/018361
§ 371 (c)(1),
(2) Date: Nov. 3, 2020

(87) PCT Pub. No.: WO2019/220964
PCT Pub. Date: Nov. 21, 2019

(65) Prior Publication Data
US 2021/0158997 A1    May 27, 2021

(30) Foreign Application Priority Data
May 17, 2018    (JP) .............................. JP2018-095426

(51) Int. Cl.
| *H01C 1/01*   | (2006.01) |
| *G01K 7/18*   | (2006.01) |
| *H01C 1/14*   | (2006.01) |
| *H01C 13/00*  | (2006.01) |

(52) U.S. Cl.
CPC ............... *H01C 1/01* (2013.01); *G01K 7/183* (2013.01); *H01C 1/14* (2013.01); *H01C 13/00* (2013.01)

(58) Field of Classification Search
CPC . H01C 1/01; H01C 1/14; H01C 13/00; G01K 7/183
See application file for complete search history.

(56) References Cited

U.S. PATENT DOCUMENTS

| 6,121,766 A    | 9/2000  | Beardmore |            |
|----------------|---------|-----------|------------|
| 6,960,980 B2 * | 11/2005 | Nakatsu   | H01C 1/14  |
|                |         |           | 323/367    |
| 2009/0039836 A1* | 2/2009 | Asada    | G01K 1/14  |
|                |         |           | 320/152    |
| 2013/0009655 A1* | 1/2013 | Marten   | G01R 35/005|
|                |         |           | 324/713    |

(Continued)

FOREIGN PATENT DOCUMENTS

| EP | 1030185 A2 | 8/2000 |
| JP | 2000-500231 A | 1/2000 |

(Continued)

OTHER PUBLICATIONS

English Translation of International Search Report from Application No. PCT/JP2019/018361, dated Aug. 6, 2019, 2 pages.

(Continued)

*Primary Examiner* — Kyung S Lee
(74) *Attorney, Agent, or Firm* — Crowell & Moring LLP

(57) ABSTRACT

Provided is a shunt resistor mount structure comprising: a shunt resistor including a pair of electrodes and a resistive body; a current detecting substrate having a control circuit mounted thereon, the substrate having a voltage detecting portion to which a pair of voltage detection terminals of the shunt resistor are connected; and a temperature sensor for measuring a temperature of the electrodes.

4 Claims, 6 Drawing Sheets

(56) References Cited

U.S. PATENT DOCUMENTS

| | | | | |
|---|---|---|---|---|
| 2014/0125429 A1* | 5/2014 | Yoshioka | ............... | G01R 1/203 |
| | | | | 333/172 |
| 2014/0320150 A1* | 10/2014 | Sato | ................ | G01R 35/005 |
| | | | | 324/601 |
| 2015/0245490 A1* | 8/2015 | Kondou | ................ | G01R 1/203 |
| | | | | 174/260 |
| 2017/0307658 A1* | 10/2017 | Chiku | ................ | G01R 15/14 |
| 2018/0156847 A1* | 6/2018 | Nakamura | ............. | G01R 1/203 |
| 2019/0162757 A1* | 5/2019 | Miyajima | .......... | G01R 19/0092 |

FOREIGN PATENT DOCUMENTS

| | | |
|---|---|---|
| JP | 2003-270274 A | 9/2003 |
| JP | 2013-174555 A | 9/2013 |

OTHER PUBLICATIONS

Written Opinion, PCT/ISA/237, from Application No. PCT/JP2019/018361, dated Aug. 6, 2019, 3 pages.

\* cited by examiner

SHUNT RESISTOR MOUNT STRUCTURE

This application is a 371 application of PCT/JP2019/018361 having an international filing date of May 8, 2019, which claims priority to JP2018-095426 filed May 17, 2018, the entire content of each of which is incorporated herein by reference.

TECHNICAL FIELD

The present invention relates to a shunt resistor mount structure (a current detection circuit using a shunt resistor).

BACKGROUND ART

A shunt resistor composed of a resistive body and low-resistance electrodes provided on both ends thereof is known.

For example, in Patent Literature 1, a semiconductor element for monitoring electric current is provided on a resistive body. The semiconductor element is disposed on, and in thermal connection with, a flat surface of a resistive element and/or power connecting portions. In this way, it is said to be possible to provide, at low cost, a current measuring device capable of monitoring electric current accurately in a short time in a power supply system having a plurality of loads.

CITATION LIST

Patent Literature

Patent Literature 1: JP 2003-270274 A

SUMMARY OF INVENTION

Technical Problem

For example, as illustrated in a perspective view of FIG. 6, a shunt resistor 101 is conventionally composed of two kinds of material: a resistive material forming a resistive body 103, and an electrode material forming electrodes 105a, 105b. Variations in resistance value temperature characteristics of the shunt resistor 101 are caused based on the characteristics of the two kinds of material. One is the resistive material, and the other is an electrically conductive material (conventionally, copper) between shunt voltage detection signal terminals and junctions between the resistive material and the electrode terminals. In FIG. 6, the region of the shunt resistor 101 that has high temperature during energization, i.e., the region of the resistive body 103, which is a heating body, is indicated by hatching. As will be seen from FIG. 6, temperature differences are caused between the electrodes 105a, 105b and the resistive body 103 at the time of energization, wherein the temperatures of the boundary regions are particularly high.

The two kinds of material have different electrical conductivity-temperature characteristics, and the shunt resistance value temperature characteristics are determined by allocation amounts determined by the structure of the shunt resistor and affecting the shunt resistance value.

FIG. 7 illustrates an example of temperature changes in resistance value determined using the shunt resistor 101. The shunt resistance value temperature characteristics are determined by the allocation amounts determined by the structure of the shunt resistor 101 and affecting the shunt resistance value. The horizontal axis shows temperature, and the vertical axis shows the rate of change in resistivity as a percent.

Referring to FIG. 7, condition 1 is where manganin temperature is equal to copper temperature; condition 2 is where manganin temperature is equal to copper temperature +15° C.; condition 3 is where manganin temperature is equal to copper temperature +25° C.; and condition 3 is where manganin temperature is equal to copper temperature +35° C. In FIG. 7, the solid line (condition 1) indicates an example in which the shunt resistor 101 not being energized was put into a constant-temperature bath and resistance value measurement was performed while varying the temperature. From FIG. 7, data for condition 1 is obtained.

However, in this case, no consideration is given to the influence of a temperature difference that is caused between a manganin portion and a copper portion in an actual energization state, as described with reference to FIG. 6. Thus, there has been the problem that only using the temperature of one member does not constitute an integral temperature compensation process for high-accuracy current detection.

One aim of the present invention is to provide, in a high-accuracy current detector based on TCR compensation of shunt resistance in a current detection circuit using a shunt resistor, a temperature compensation scheme more accurate than a conventional scheme.

Another aim of the present invention is to enable detection of an anomaly due to, e.g., defective fastening of a shunt-mounting screw, before an overheat protection-activating temperature is reached, thus making it possible to detect an anomaly without increasing the energization current.

Solution to Problem

According to an aspect of the present invention, there is provided a shunt resistor mount structure including: a shunt resistor having a pair of electrodes and a resistive body; a current detecting substrate on which a control circuit is mounted, the substrate having a voltage detecting portion to which a pair of voltage detection terminals of the shunt resistor are connected; and a temperature sensor for measuring a temperature of the electrodes.

Preferably, the temperature sensor may be mounted on the substrate. Mounting on the substrate facilitates temperature correction and the like.

Preferably, the temperature sensor may include a first temperature sensor for measuring a temperature of the resistive body.

With the first temperature sensor, it is possible to accurately measure the temperature of the resistive body, which is a heating body.

The temperature sensor may include a second temperature sensor and a third temperature sensor for measuring temperatures of the pair of electrodes.

With the electrode temperatures sensed by the second and third temperature sensors and the resistive body temperature sensed by the first temperature sensor, it is possible to improve temperature compensation of a shunt resistance value.

Preferably, the second and third temperature sensors may be provided in positions spaced apart more from the resistive body than the voltage detection terminals.

By spacing a little away from a joint portion of the resistive body, which is a heating body, the influence of heating of the resistive body can be suppressed.

The description includes the contents disclosed in JP Patent Application No. 2018-095426 based on which the present application claims priority.

Advantageous Effects of Invention

According to the present invention, it is possible to achieve high-accuracy current detection for temperature compensation of shunt resistance value.

According to the present invention, it is also possible to provide a shunt current detector mount structure which is highly safe, accurate, and reliable.

DESCRIPTION OF EMBODIMENTS

In the following, a shunt resistor mount structure (a current detection circuit using a shunt resistor) according to an embodiment of the present invention will be described in detail with reference to the drawings.

As used herein, the direction in which the electrode-resistive body-electrode of a resistor is arranged is referred to as the length direction, and a direction intersecting the length direction is referred to as the width direction.

First Embodiment

Figure 1:
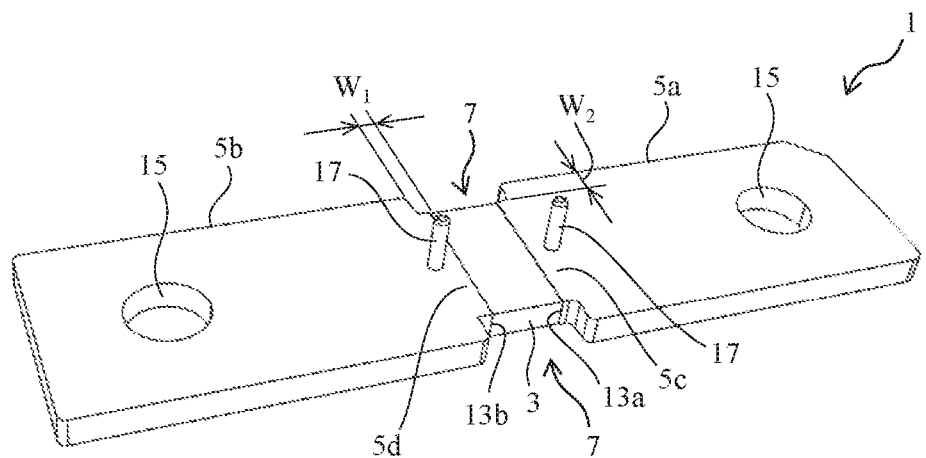
FIG. 1 is a perspective view illustrating a configuration example of a current detection device using a shunt resistor according an embodiment of the present invention.

First, a current detection device 1 using a shunt resistor according to a first embodiment of the present invention is described. FIG. 1 is a perspective view illustrating a configuration example of the current detection device 1 using a shunt resistor according to the present embodiment. The current detection device 1 using a shunt resistor illustrated in FIG. 1 is provided with: two electrodes 5a (a first electrode), 5b (a second electrode); a resistive body 3 disposed between the electrodes 5a, 5b; and voltage detection terminals 17. A portion composed of the resistive body 3 and the electrodes 5a, 5b may also be referred to as an electrically conductive body. The electrodes 5a, 5b may be referred to as electrode terminals. Each of the electrodes 5a, 5b is provided with a main electrode portion (the main electrode portion being defined as a portion of 5a, 5b excluding 5c, 5d) on the end side, and a narrow electrode portion 5c, 5d on the resistive body 3 side which is narrower in width than the main electrode portion by $2W_2$. The resistive body 3 is disposed between the narrow electrode portions 5c, 5d. The narrow electrode portions 5c, 5d each have a dimension $W_1$ in the length direction. The dimension $W_1$ is on the order of 1 to 3 mm, for example. In FIG. 1, sign 15 indicates bolt holes.

Both the electrode material and the resistive material may be obtained by cutting an elongated material (plate), for example.

In the present example, the voltage detection terminals 17 are provided, one in each of the main electrode portions in the vicinity of the narrow electrode portions 5c, 5d.

The voltage detection terminals 17 may be provided in the narrow electrode portions 5c, 5d. By providing the voltage detection terminals 17 in the narrow electrode portions 5c, 5d or in the main electrodes in the vicinity thereof, it is possible to reduce the distance between the voltage detection terminals 17, and to improve the accuracy of current measurement by four-terminal sensing.

In the structure illustrated in FIG. 1, it is possible to form a narrow portion or a narrowed width portion having a narrowed width, by providing recesses 7. The recesses 7 recede inward in the width direction in partial regions including joint portions 13a, 13b formed by welding or the like of the resistive body 3 and the electrode portions 5a, 5b. In this case, the width of the narrow electrode portions 5c, 5d and the width of the resistive body 3 are substantially the same. The portion with a narrow width formed by the recesses 7 is referred to as a narrow portion or a narrowed width portion.

As the material for the resistive material forming the resistive body 3, it is possible to use sheet material of Cu—Ni based, Cu—Mn based, or Ni—Cr based metals, for example. It is also possible to use manganin (registered trademark) comprising 86% copper, 12% manganese, and 2% nickel. In the following, an example is described which includes, but is not limited to, manganin.

Figure 2:
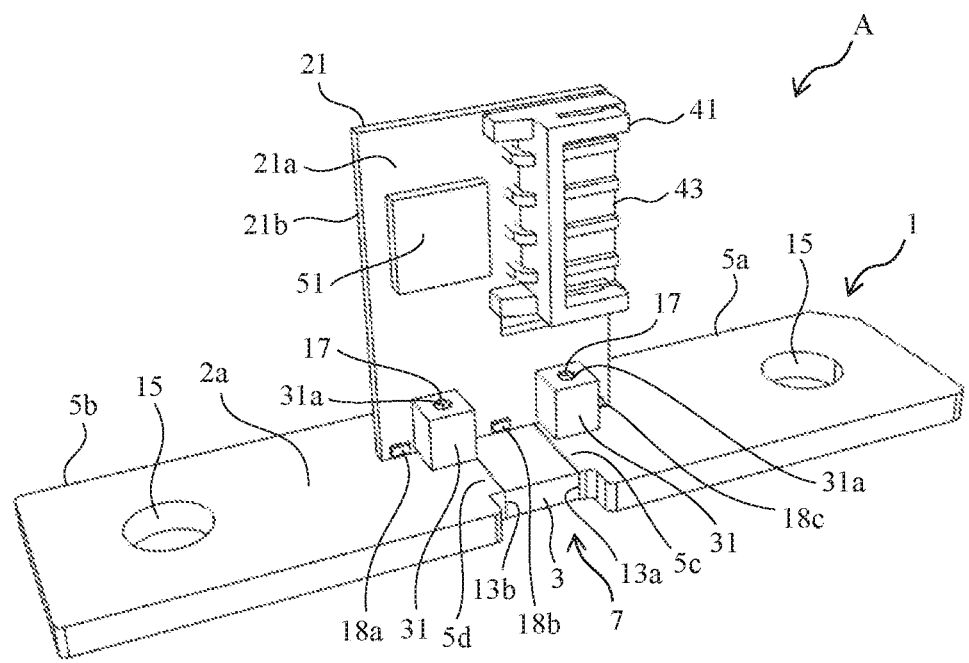
FIG. 2 is a perspective view illustrating a configuration example of a shunt resistor mount structure in which a current detector substrate with a control IC mounted thereon is mounted on the current detection device using a shunt resistor of FIG. 1.

FIG. 2 is a perspective view illustrating a configuration example of a shunt resistor mount structure in which a substrate 21 of a control IC-equipped current detector is mounted on the current detection device 1 using a shunt resistor illustrated in FIG. 1.

As illustrated in FIG. 2, the substrate 21 is disposed vertically on one surface 2a of the current detection device 1 using a shunt resistor. In the example of FIG. 2, a control IC 51 is mounted on one surface 21a of the substrate 21. The one surface 2a adjoins a side surface 21b intersecting the one surface 21a of the substrate 21. In this state, the one surface 21a of the substrate 21 is formed with terminal accommodating portions 31, 31 for respectively accommodating the two voltage detection terminals 17, 17, for example. The terminal accommodating portions 31, 31 have terminal inserting holes 31a, 31a formed for inserting the two voltage detection terminals 17, 17. The two voltage detection terminals 17, 17 are electrically connected, in the terminal inserting holes 31a, 31a, to wires or the like, which are not illustrated but formed on the substrate 21. Accordingly, voltage signals from the two voltage detection terminals 17, 17 are transmitted to the control IC 51 on the substrate 21. The control IC 51 is able to determine a current flowing through the shunt resistor, on the basis of the voltage signals from the two voltage detection terminals 17, 17.

A connector 41 including a terminal connecting portion 43 for connection with an external device or the like is formed on the substrate 21. Thus, it is possible to perform, through the connector, a process for causing a current value determined by the control IC 51 to be displayed on the external device, for example.

In addition, the one surface 21a of the substrate 21 over the one surface 2a is provided with a first temperature sensor 18a, a second temperature sensor 18b, and a third temperature sensor 18c. Sensing signals from the temperature sensors can be read by the control IC 51, for example.

The first temperature sensor 18a is provided over the electrode 5b and senses the temperature of the electrode 5b. The first temperature sensor 18a is preferably provided over the electrode 5b in the vicinity of the resistive body 3 or in the vicinity of the recesses 7.

The second temperature sensor 18b is provided over the resistive body 3 and senses the temperature of the resistive body 3.

The third temperature sensor 18c is provided over the electrode 5a and senses the temperature of the electrode 5a. The third temperature sensor 18c is preferably provided over the electrode 5a in the vicinity of the resistive body 3 or in the vicinity of the recesses 7.

Figure 3:
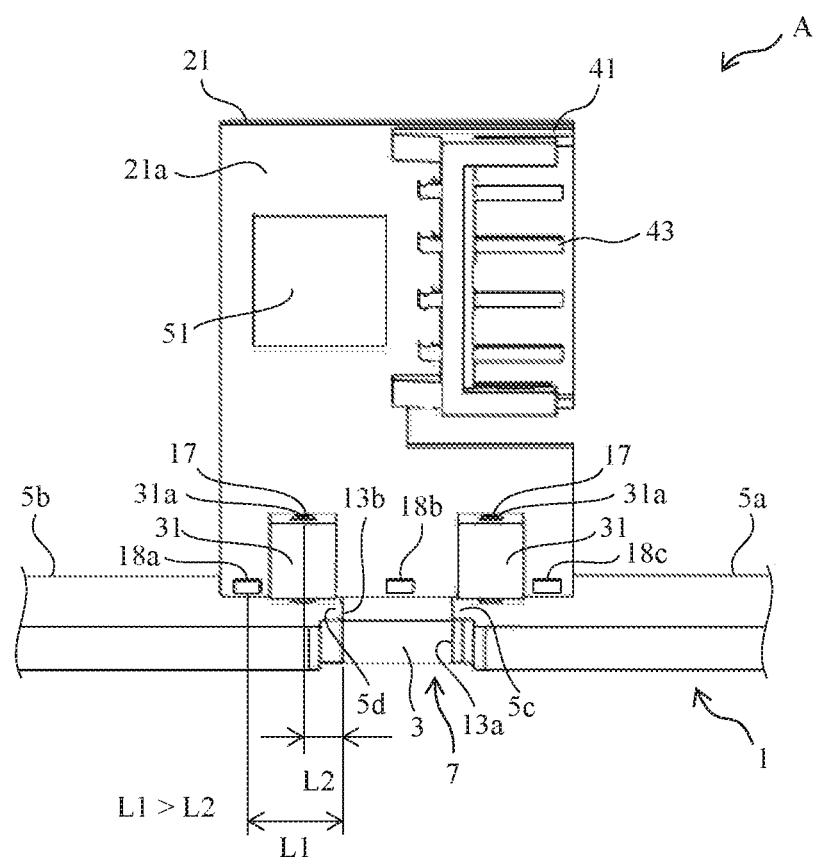
FIG. 3 illustrates an enlarged view of FIG. 2 in the vicinity of a first temperature sensor.

FIG. 3 is an enlarged view in the vicinity of the first temperature sensor 18 of FIG. 2. As illustrated in FIG. 2 and FIG. 3, the position in which the first temperature sensor 18a is disposed is preferably spaced apart more from the resistive body 3 than the voltage detection terminal 17 in the length direction. For example, as illustrated in FIG. 3, when the distance in the length direction from the position (the center position in the length direction) of the first temperature sensor 18 to the joint portion 13b is L1, and the distance in the length direction from the position (center position) of the voltage detection terminal 17 to the joint portion 13b is L2, it is preferable that L1>L2. L1 is set longer than L2 because if too close to the joint portion 13b of the resistive body 3, which is a heating body, the likelihood of being subjected to the influence of the heating of the resistive body 3 is greater.

The third temperature sensor 18c also preferably has a positional relationship similar to that of the first temperature sensor 18a.

The second temperature sensor 18b is preferably provided in the central position in the length direction of the resistive body 3. In this way, it is possible to sense the temperature of the resistive body 3 accurately.

Figure 4:
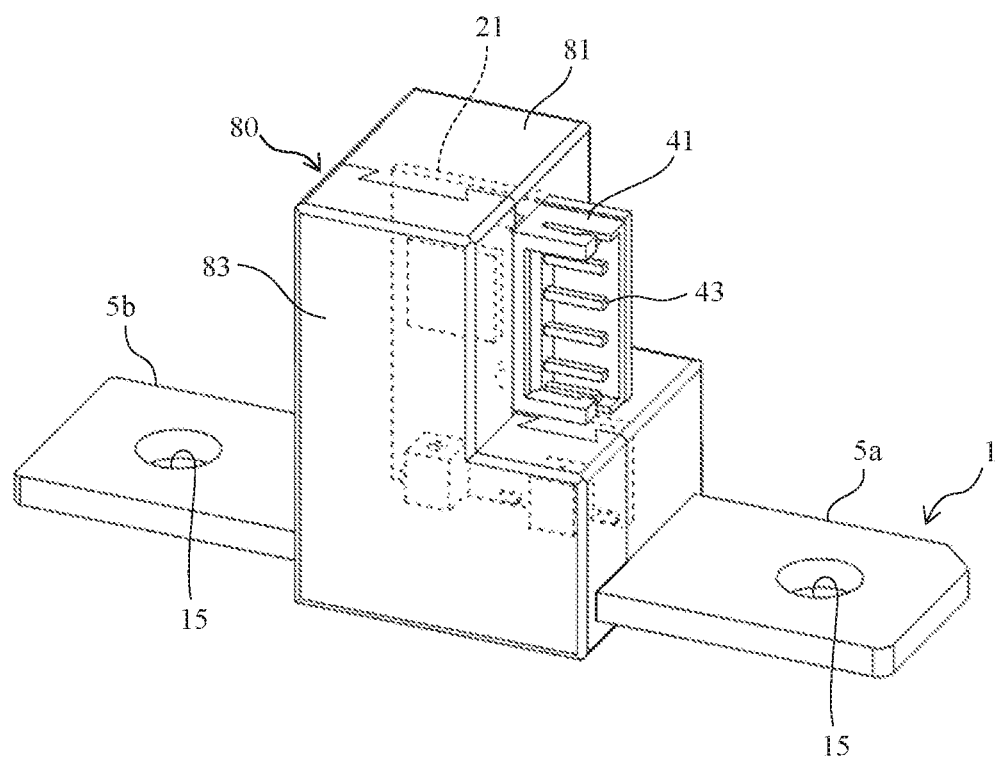
FIG. 4 is a perspective view illustrating a configuration in which a case is attached to cover the substrate in the mount structure illustrated in FIG. 2.

FIG. 4 is a perspective view illustrating a configuration in which a case 80 is attached to cover the substrate 21 in the mount structure of FIG. 2. For example, a first case member 81 and a second case member 83 are provided so as to enclose the substrate 21. The first case member 81 and the second case member 83 may be configured to be put together into the single case 80 by means of a known fitting structure. The case 80 is configured such that the terminal connecting portion 43 of the substrate 21 is disposed outside the case 80. In this way, it is possible to perform connection of signal cables or the like from the terminal connecting portion 43 easily. Further, the electrode portions 5a, 5b are also configured to protrude outside the case 80. In this way, it is possible to apply a desired voltage across the electrodes 5a, 5b of the shunt resistor.

As described above, by adopting the structure in which the case members 81, 83 cover the periphery of the resistive body 3, the substrate 21 can be protected. Because the substrate 21 and also the resistive body 3 are accommodated in the case, by performing temperature compensation with the first to third temperature sensors 18a to 18c provided for the resistive body 3 and the electrodes 5a, 5b in the vicinity thereof, it is possible to perform more accurate temperature compensation taking the influence of the case into consideration.

(Explanation of Temperature Compensation Circuit)

Next, a temperature compensation circuit using the first to third temperature sensors 18a to 18c will be described. The temperature compensation circuit may be mounted in the control Ic 51.

Figure 5:
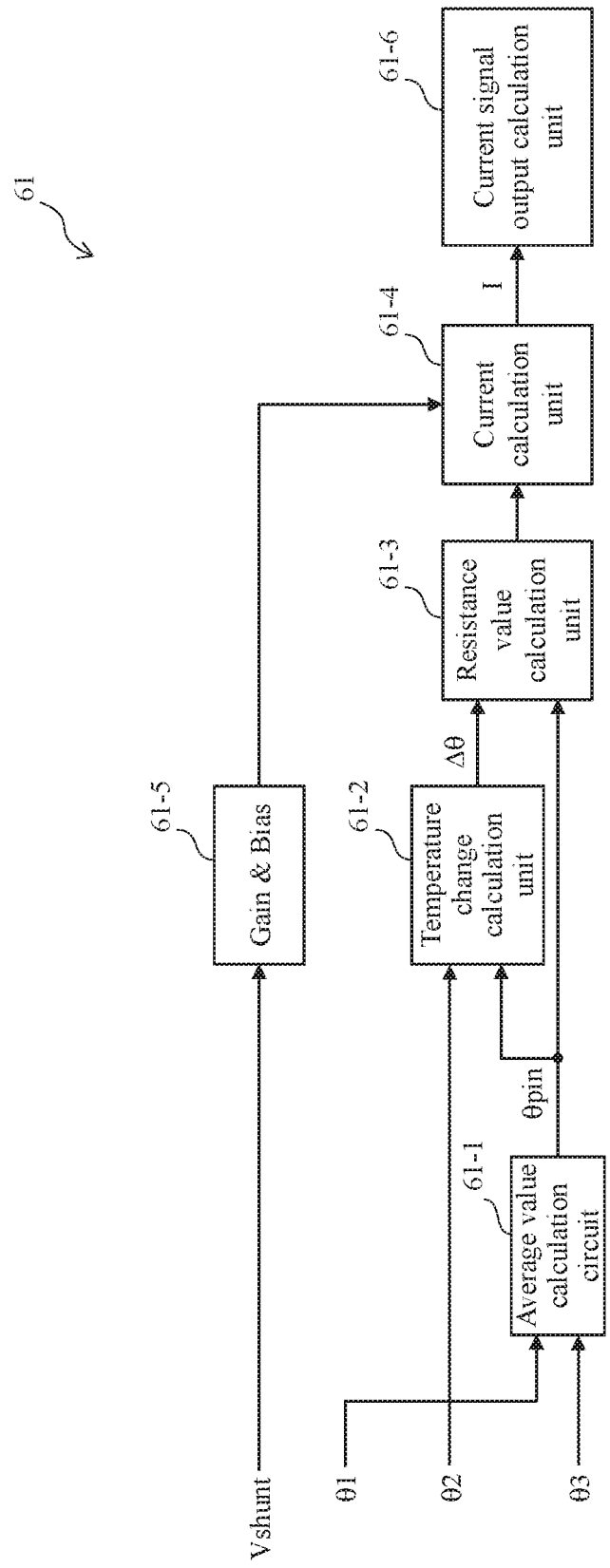
FIG. 5 is a functional block diagram illustrating a configuration example of a temperature compensation circuit for the shunt resistor.
Figure 6:
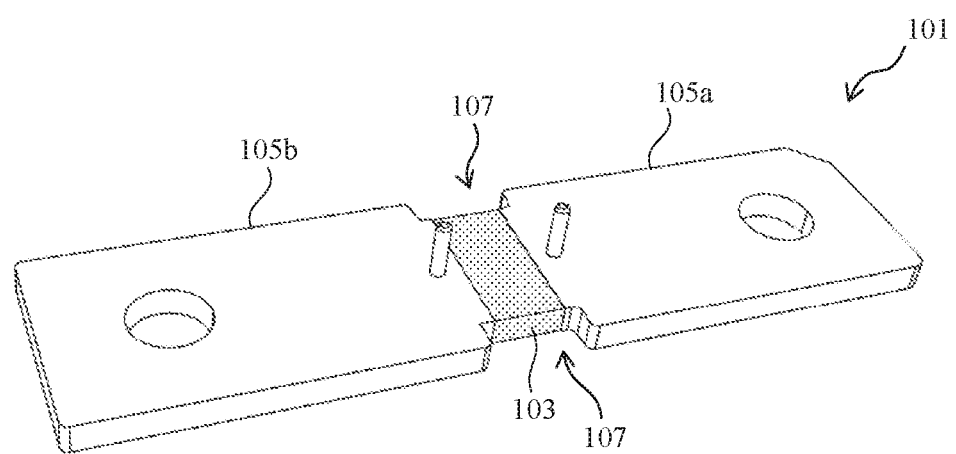
FIG. 6 is a perspective view illustrating a configuration example of a conventional shunt resistor.
Figure 7:
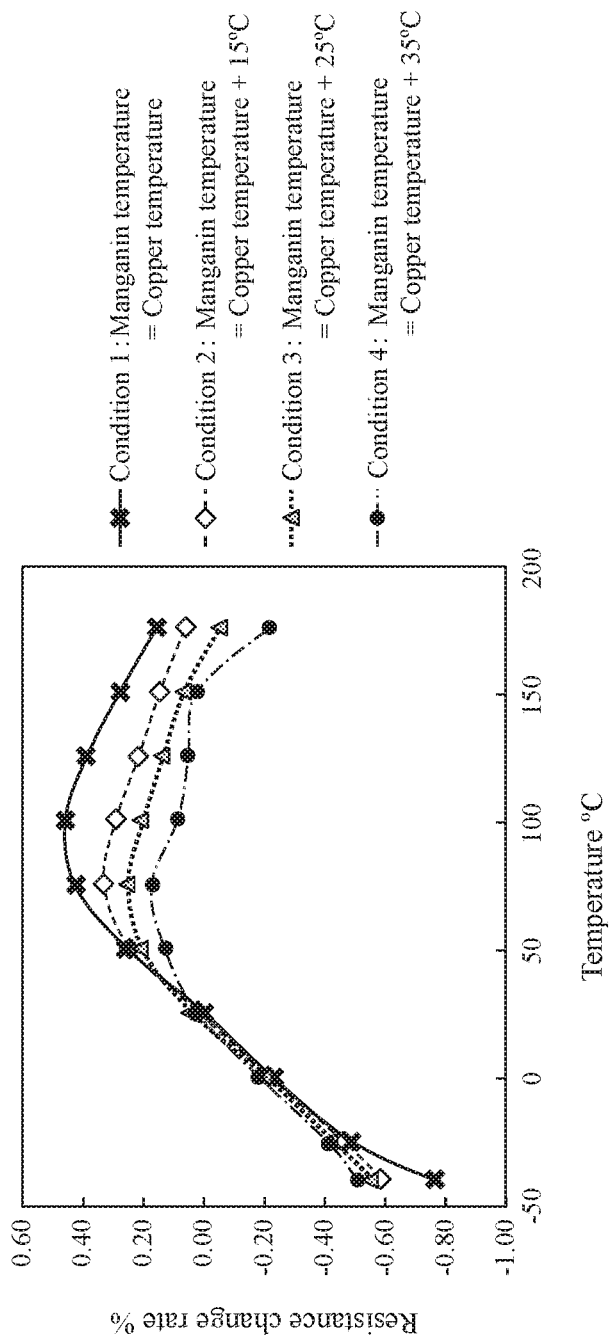
FIG. 7 illustrates an example of resistance value temperature changes determined using the shunt resistor illustrated in FIG. 6.

FIG. 5 is a functional block diagram of a configuration example of a temperature compensation circuit 61 of the shunt resistor 1. As illustrated in FIG. 5, the temperature compensation circuit 61 is provided with: an average value calculation circuit 61-1 which calculates an average value of a measured temperature 1 at the first temperature sensor 18a, a measured temperature θ2 at the second temperature sensor 18b, and a measured temperature θ3 at the third temperature sensor 18c; a temperature change calculation unit 61-2 which calculates a temperature change (temperature increase) Δθ of the resistive body 3 of manganin or the like, on the basis of the measured temperature θ2 and θpin which is the output of the average value calculation circuit 61-1; a resistance value calculation unit (including a resistance value table) 61-3 which determines a resistance value on the basis of Δθ and θpin; a current calculation unit 61-4 which determines a current detected from the output of a processing unit 61-5 and the resistance value, the processing unit 61-5 determining the gain and bias of the shunt resistor 1; and a current signal output calculation unit 61-6 which determines a current signal output on the basis of the determined current I.

As described above, by using the temperature compensation circuit in which the first to third temperature sensors 18a to 18c are used, it is possible to achieve highly accurate temperature compensation.

In the configuration described above, in a high-accuracy current detection device using a shunt resistor, temperature detection points for compensating the resistance value temperature characteristics are provided for the resistive element portion of manganin or the like and also for the copper portions near the shunt voltage output signals. In this way, it is possible to measure the temperatures of the resistive body and the electrodes more accurately, and, therefore, to achieve more highly accurate temperature compensation.

As described above, the shunt resistor mount structure of the present embodiment makes it possible to perform high-accuracy current detection by taking into consideration, for temperature compensation of the shunt resistance value, the temperature difference, caused at the time of energization, between the resistive body of manganin or the like and the electrodes of copper or the like.

Also, with respect to an abnormal temperature increase in the case of a shunt-mounting screw fastening failure, an anomaly can be detected at or below an overheat protection level at a shunt absolute value temperature, making it possible to provide a shunt current detector which is highly safe, accurate, and reliable.

In the foregoing embodiment, the configurations and the like that are illustrated are not to be construed as limiting, but may be modified, as appropriate, as long as the effects of the present invention are provided. Other modifications may be made, as appropriate, and implemented without departing from the scope of the purpose of the present invention.

The respective constituent elements of the present invention may be selectively adopted as desired, and an invention comprising a selectively adopted configuration is also included in the present invention.

INDUSTRIAL APPLICABILITY

The present invention may be utilized in a shunt resistor mount structure.

All publications, patents and patent applications cited in the present description are incorporated herein by reference in their entirety.

The invention claimed is:

1. A shunt resistor mount structure comprising:
    a shunt resistor including a pair of electrodes and a resistive body arranged between the pair of electrodes in a longitudinal direction, wherein the resistive body has a higher resistivity than the pair of electrodes;
    a pair of voltage detection terminals provided, respectively, on the pair of electrodes adjacent to the resistive body, wherein each voltage detection terminal is located at a distance L2 measured in the longitudinal direction from a longitudinal end proximate thereto of the resistive body;
    a current detecting substrate on which a control circuit is mounted, the substrate having a voltage detecting portion electrically connected to the pair of voltage detection terminals for detection of a voltage across the longitudinal ends of the resistive body;
    a first temperature sensor for measuring a temperature of one of the electrodes of the shunt resistor the first temperature sensor being located at a distance L1 measured in the longitudinal direction from a longitudinal end proximate thereto of the resistive body, wherein the distance L1 is set greater than the distance L2; and
    a second temperature sensor for measuring a temperature of the resistive body.

2. The shunt resistor mount structure according to claim 1, wherein the first and second temperature sensors are mounted on the substrate.

3. The shunt resistor mount structure according to claim 1, further comprising a third temperature sensor for measuring temperatures of the other of the electrodes of the shunt resistor.

4. The shunt resistor mount structure according to claim 3, wherein the third temperature sensor is located at a distance L3 measured in the longitudinal direction from a longitudinal end proximate thereto of the resistive body, wherein the distance L3 is set greater than the distance L2.

* * * * *